(No Model.)
H. G. SHEPARD.
HANDLE BAR FOR CYCLES.
No. 605,752.          Patented June 14, 1898.
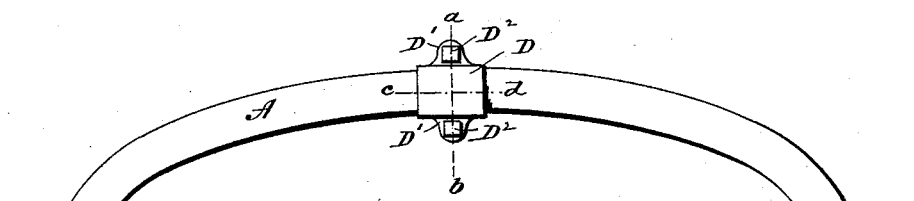
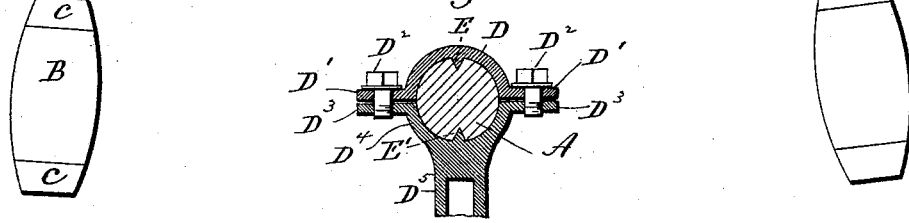
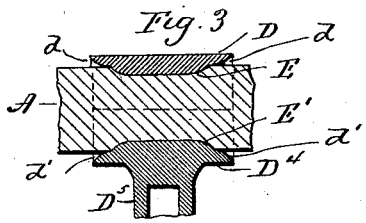
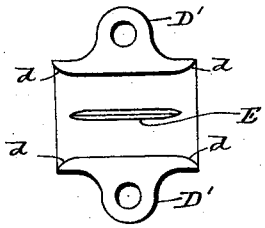
Witnesses,
J. H. Shumway
Lillian D. Kelsey
Harvey G. Shepard.
Inventor.
By attys
Earle Seymour

UNITED STATES PATENT OFFICE.

HARVEY G. SHEPARD, OF NEW HAVEN, CONNECTICUT, ASSIGNOR TO H. G. SHEPARD & SONS, OF SAME PLACE.

HANDLE-BAR FOR CYCLES.

SPECIFICATION forming part of Letters Patent No. 605,752, dated June 14, 1898.

Application filed January 18, 1896. Serial No. 575,955. (No model.)

*To all whom it may concern:*

Be it known that I, HARVEY G. SHEPARD, of New Haven, in the county of New Haven and State of Connecticut, have invented a new Improvement in Handle-Bars for Cycles; and I do hereby declare the following, when taken in connection with the accompanying drawings and the letters of reference marked thereon, to be a full, clear, and exact description of the same, and which said drawings constitute part of this specification, and represent, in—

Figure 1, a plan view of a handle-bar constructed in accordance with my invention; Fig. 2, a sectional view on the line $ab$ of Fig. 1; Fig. 3, a sectional view on the line $cd$ of Fig. 1; Fig. 4, a detached reverse plan view of the removable cap of the bearing.

My invention relates to an improvement in handle-bars for cycles, the object being to provide cycles with suitably-mounted bent-wood handle-bars, which commend themselves on account of their lightness, elegance of appearance, and also on account of being agreeable to the touch, and because they absorb the vibration of the machine and relieve the hands.

With these ends in view my invention consists in certain details of construction and combinations of parts, as will be hereinafter described, and pointed out in the claim.

In carrying out my invention as herein shown I employ a bent-wood handle-bar A, formed from a single piece of wood and provided at its ends with cork handles B B, mounted in rubber ferrules or caps C. It is apparent, however, that I am not limited to the particular form of bar illustrated nor to the use of any particular material for the handles or to applying the same in any particular manner. The bar is mounted in a two-part box-bearing, the upper member D of which consists of a removable cap having perforated ears $D'$ $D'$, receiving screw-bolts $D^2$ $D^2$, by means of which the cap is secured to the perforated and threaded ears $D^3$ $D^3$, projecting in opposite directions from the lower member $D^4$ of the bearing, the said lower member being formed integral with the upper end of the tubular handle-bar post $D^5$. It will be understood that the cap has a longitudinal semicircular groove formed in it to fit over the bar and that the lower member of the bearing has a corresponding groove in it to receive the bar. For the purpose of positively gripping the handle-bar where the same passes through the bearing the cap $D^2$ is furnished with a longitudinally-arranged inwardly-projecting integral tooth or rib E, while the lower member $D^4$ of the bearing is provided with an upwardly-projecting corresponding integral tooth or rib $E'$, located directly opposite the tooth or rib E aforesaid. These teeth or ribs are made so sharp and knife-like that they bite deeply into the wood of the bar and positively hold the same against rotation in the bearing and avoid the necessity of clamping the cap down upon the bar with that crushing force which would have to be employed in case friction were relied upon to hold the bar against rotation in the bearing. It is scarcely necessary to state that that crushing force is objectionable, inasmuch as it crushes the fibers of the wood and weakens the handle-bar.

By making the teeth or ribs very sharp and knife-like they are adapted to penetrate the wood at any point and to force their way deeply into it, whereby it becomes unnecessary to provide the bar with recesses or incisions for the reception of the teeth and whereby also it becomes possible to set the bar in any desired position of inclination. The sharp edges of the teeth or ribs will enter the bar at any point therein, crowding the wood aside, but not crushing it or cutting its fiber except longitudinally. On the other hand, if recesses or prepared incisions are made in the bar for the reception of the ribs or teeth such recesses or incisions must be spaced to such an extent that close adjustments of the bar cannot be made, for it will be readily seen that a short space on the circumference of the bar itself becomes a very considerable space when measured at the outer ends of the handles.

In the use of the bar the rider often lifts up or pushes down on the handles, thereby springing the bar from its ends inward to the points where it enters the bearing. In order to prevent it from being brought sharply against the bearing at these points, the ends of the cap are beveled, as at $d$, as shown in Figs. 3 and 4, while the ends of the lower member $D^1$ of the bearing are correspondingly beveled, as shown at $d'\ d'$ in Fig. 3. These bevels give clearance to the bar and prevent the same from being marred or cut into at the points mentioned.

It is apparent that by employing the removable cap D the bar may be readily applied to and removed from the machine. It is also apparent that by rotating the bar on its longitudinal axis in the lower member $D^1$ of the bearing and so bringing it into the required position and then applying the cap D the bar may be adjusted for position, for the teeth or projections will positively bite into or force their way into it at one point as well as another.

It is apparent that in carrying out my invention some changes from the construction herein shown may be made, and I would therefore have it understood that I do not limit myself to the exact construction shown, but hold myself at liberty to make such changes and alterations as fairly fall within the spirit and scope of my invention. I am aware, however, that it is old to provide the upper ends of the handle-bar posts of bicycles with two-part handle-bar bearings comprising a lower member and a removable cap, which is connected with the said lower member by means of clamp-screws. I do not therefore claim that construction broadly.

Having fully described my invention, what I claim as new, and desire to secure by Letters Patent, is—

The combination in a handle-bar bearing, with a rigid lower member formed with a horizontally-arranged, semicircular or substantially semicircular groove, and with a long, upwardly-projecting integral knife-like rib or tooth arranged longitudinally in the center of the bottom of the said groove, of a removable upper member or cap having a semicircular or substantially semicircular groove formed in it, and provided with a long longitudinally-arranged, downwardly-projecting integral knife-like rib or tooth located in the center of its bottom and therefore opposite the rib or tooth aforesaid, and means for securing the said upper member to the said lower member, the ends of the said member and cap being beveled to avoid biting the bar at the points where the same emerges from the bearing, substantially as described.

In testimony whereof I have signed this specification in the presence of two subscribing witnesses.

HARVEY G. SHEPARD.

Witnesses:
FRED. C. EARLE,
GEO. D. SEYMOUR.